Aug. 15, 1933.  H. D. LESTER  1,922,965
TRANSMISSION GEAR
Filed Feb. 2, 1932  4 Sheets-Sheet 1
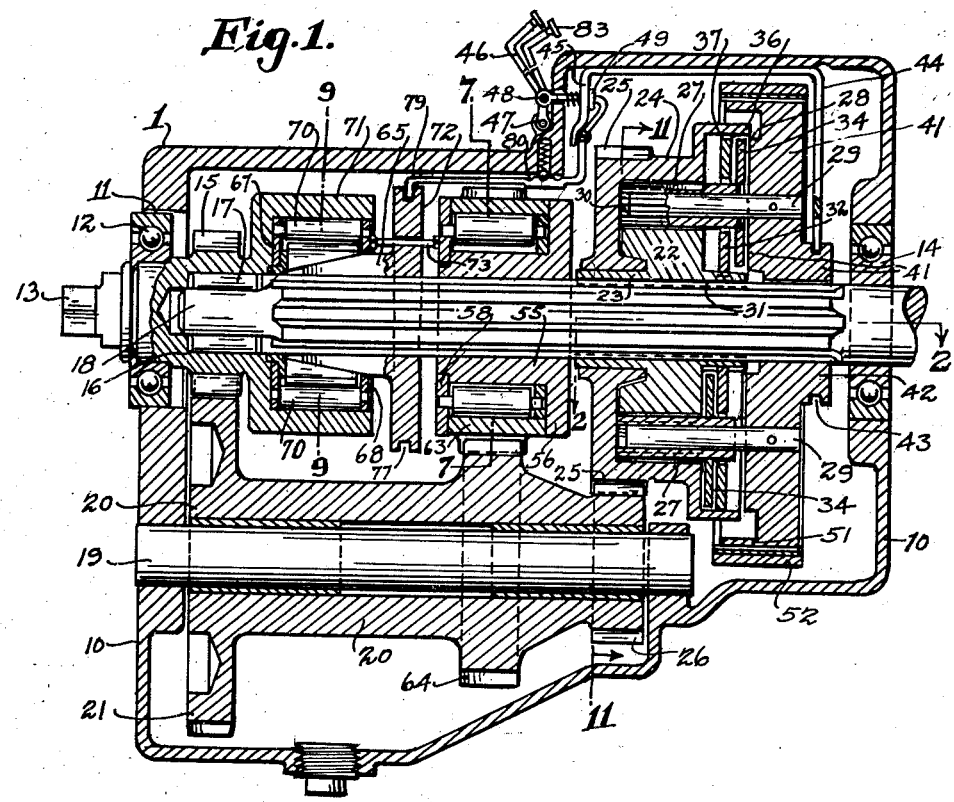
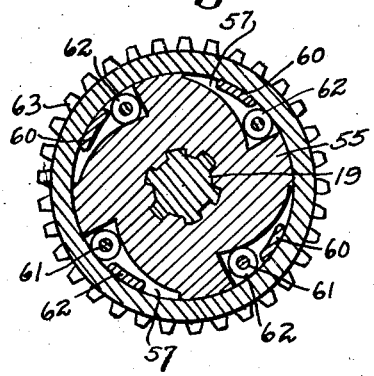
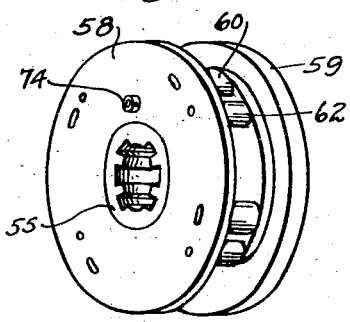
Inventor
HOPE D. LESTER
By Mason Fenwick & Lawrence
Attorneys Aug. 15, 1933.  H. D. LESTER  1,922,965
TRANSMISSION GEAR
Filed Feb. 2, 1932  4 Sheets-Sheet 2
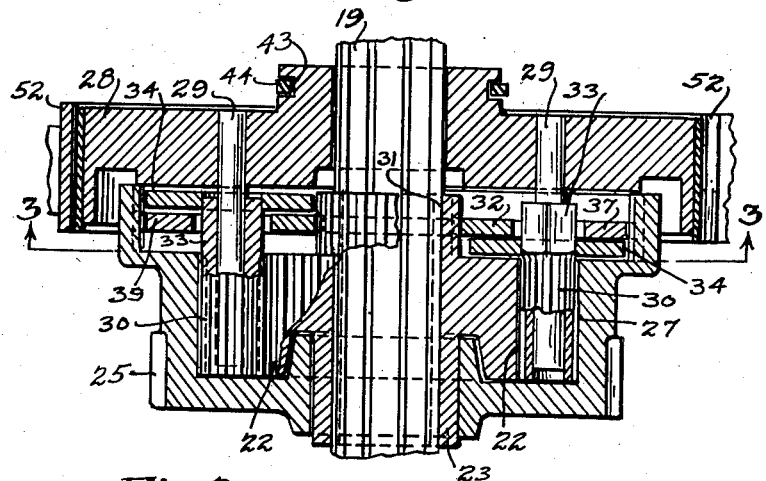
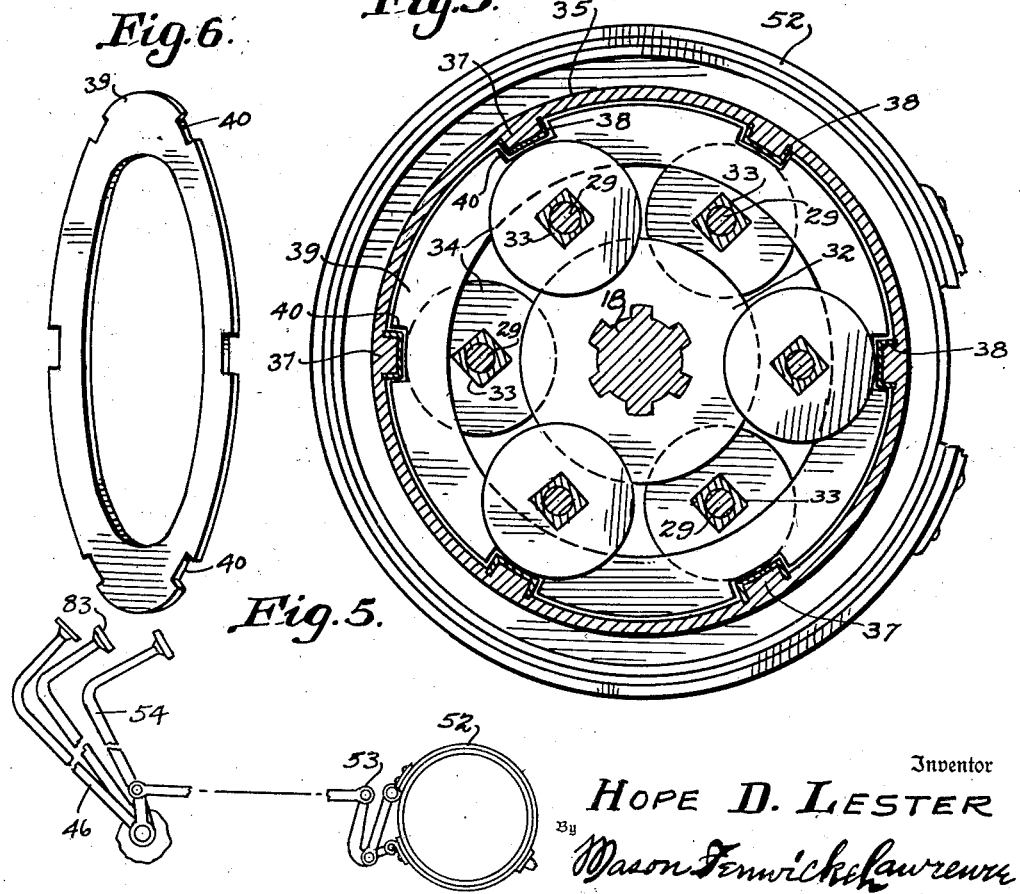
Inventor
HOPE D. LESTER
By
Mason Fenwick Lawrence
Attorneys Aug. 15, 1933.      H. D. LESTER      1,922,965
TRANSMISSION GEAR
Filed Feb. 2, 1932      4 Sheets-Sheet 3
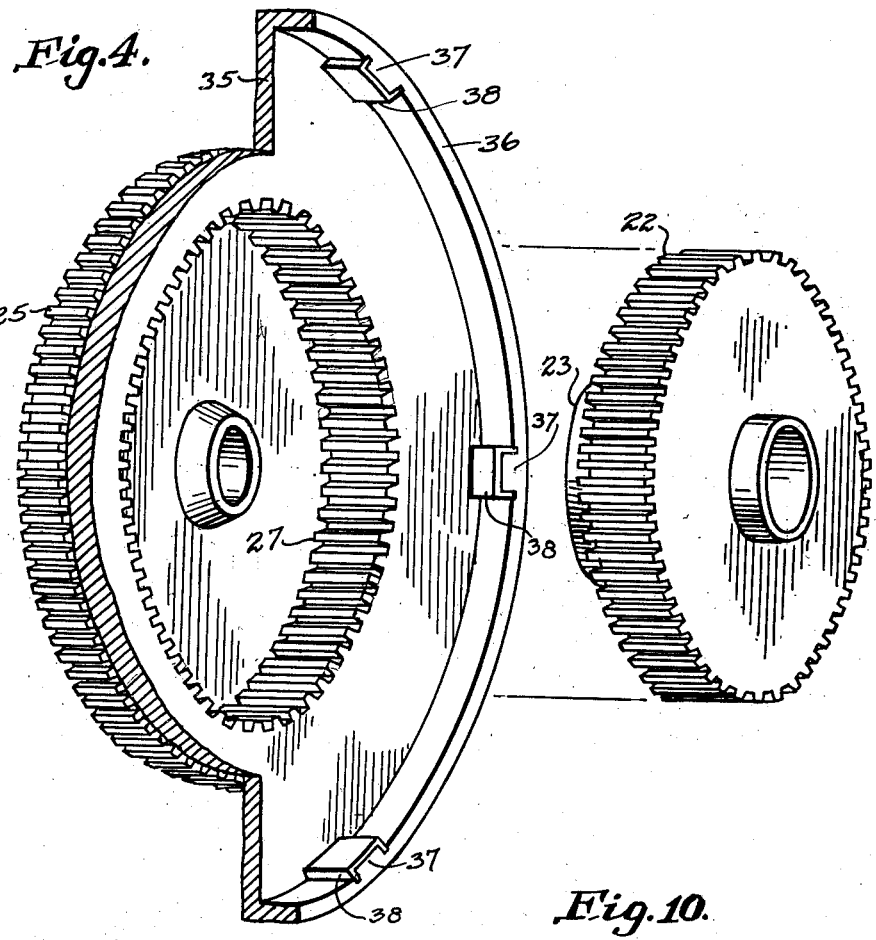
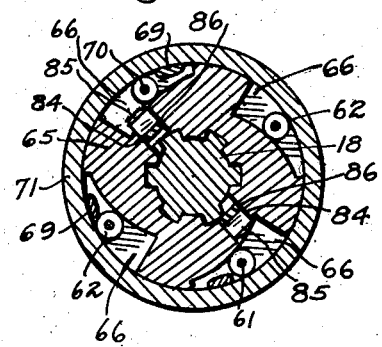
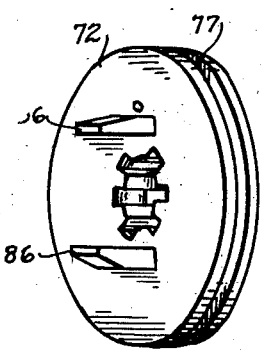
Inventor
HOPE D. LESTER
By Mason Fenwick & Lawrence
Attorneys Aug. 15, 1933.  H. D. LESTER  1,922,965
TRANSMISSION GEAR
Filed Feb. 2, 1932  4 Sheets-Sheet 4
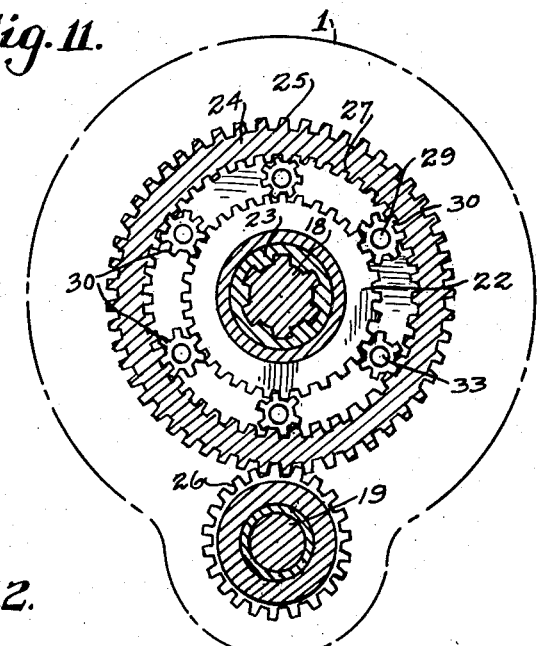
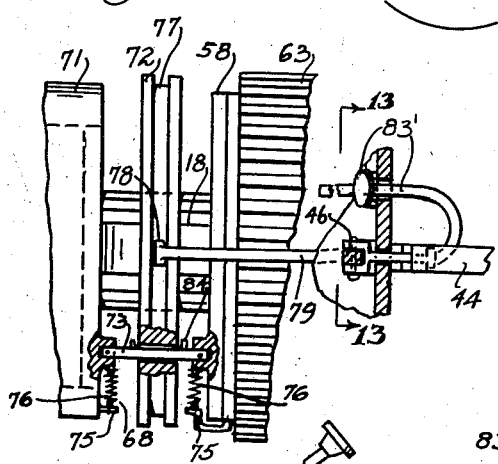
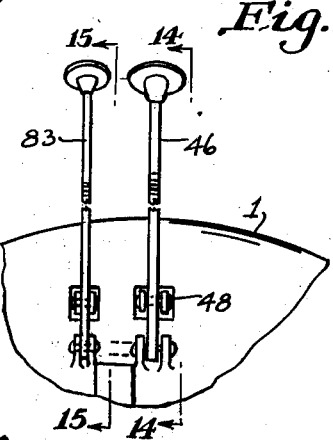
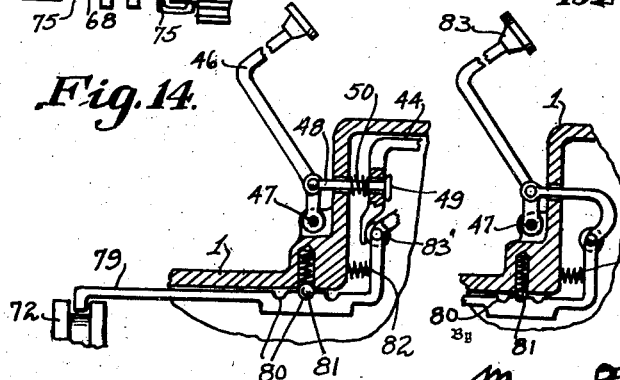
Inventor
HOPE D. LESTER
Mason Fenwick Lawrence
Attorneys Patented Aug. 15, 1933

1,922,965

UNITED STATES PATENT OFFICE 1,922,965

TRANSMISSION GEAR

Hope Darring Lester, Miami, Fla.

Application February 2, 1932. Serial No. 590,474

3 Claims. (Cl. 74—34)

This invention relates to transmission gearing such as is used in automobiles and has special reference to a free wheeling gearing of the planetary type.

One important object of the present invention is to provide an improved transmission gearing wherein the gears for the several speeds will be constantly in mesh.

A second important object of the invention is to provide an improved device of this character wherein the hand lever commonly used for shifting gears will be eliminated, the change in speed and direction being controlled by pedals.

A third important object of the invention is to provide a novel means by which free wheeling may be prevented when desired.

A fourth important object of the invention is to provide an improved clutch arrangement for the low speed and reverse gearing of such a transmission.

With the above and other objects in view, as will be presently apparent, the invention consists in general of certain novel arrangements of parts and combinations of details hereinafter fully described, illustrated in the accompanying drawings and specifically claimed.

In the accompanying drawings like characters of reference indicate like parts in the several views, and—

Figure 1 is a vertical section extending longitudinally of the improved transmission;

Figure 2 is a fragmentary horizontal section taken on the line 2—2 of Figure 1;

Figure 3 is a section taken on the line 3—3 of Figure 2;

Figure 4 is a detail perspective showing certain gears of the low speed mechanism in disassembled positions;

Figure 5 is a diagram illustrating an assembly of pedal and brake mechanism forming a part of this invention;

Figure 6 is a perspective view of a certain clutch plate used in connection with the parts shown in Figure 2;

Figure 7 is a detail section taken on the line 7—7 of Figure 1;

Figure 8 is a perspective of a roller cage parts of which are shown in Figure 7;

Figure 9 is a detail section on the line 9—9 of Fig. 1;

Figure 10 is a perspective view of a certain operating plate used in connection with the intermediate and high gearing of this transmission;

Figure 11 is a vertical transverse section taken on the line 11—11 of Figure 1;

Figure 12 is a fragmentary plan view of clutch shifting mechanism interposed between high and intermediate speed gearing forming part of this invention;

Figure 13 is a fragmentary elevation of pedal mechanism illustrated in Figure 12;

Figure 14 is a fragmentary vertical section taken on line 14—14 of Figure 13;

Figure 15 is a similar section taken on line 15—15 of Figure 13; and

Figure 16 is a perspective view of a clutch plate forming part of this invention.

In the embodiment of the invention herein illustrated there is provided the usual casing or housing 10 having an opening 11 at one end. In the opening 11 is fitted a ball bearing 12 wherein is journaled a driving shaft 13 adapted to be connected to an engine in the manner common to such devices. In the opposite end of the housing 10 is an opening wherein is fitted a ball bearing 14 alined with the bearing 12. On the shaft 13, just within the housing 10 is a gear 15 wherein is a bearing recess 16 having a roller bearing 17 mounted therein. A driven shaft or tail shaft 18 is journaled in the bearings 14 and 17 and is, between the bearings, of toothed spline construction. Supported in the lower part of the casing, parallel to the shaft 18, is a counter shaft 19 whereon is revolubly mounted a sleeve 20. Formed on this sleeve at one end thereof is a gear 21 with which the gear 15 meshes so that, so long as the shaft 13 is in rotation the sleeve 20 will be rotated.

Mounted on the splined portion of the shaft, adjacent the bearing 14, is a gear 22 having at its forward end of a journal 23 whereon is journaled a drum 24 which is provided with an external gear 25. A gear 26, on the rear end of the sleeve 20 meshes with the gear 25 and thus the drum 24 is constantly rotated during rotation of the shaft 13. The drum 24 is also provided with an internal gear 27 confronting the gear 22 and concentric thereto. A carrier plate or disk 28 is revolubly mounted on the shaft 18 and mounted in this plate is a series of stub shafts 29, preferably six in number and evenly spaced from the axis of the shaft 18 and from each other. The forward ends of these shafts project between the gears 22 and 27 and carry freely revoluble gears 30. The gear 22 is provided with a forwardly extending toothed or splined portion 31 whereon is splined a clutch disk 32.

Each gear 30 has a forwardly extending square hub portion 33 whereon is fitted a clutch disk 34. There are six of these clutch disks 34 and they are arranged alternately in front and to the rear of the disk 32. The drum 24 is expanded at its rear end to provide a shoulder 35 and peripheral flange 36. Spaced lugs 37 are provided on the inner face of the flange 36 and are fitted with renewable wear plates 38. A clutch annulus 39 is fitted within the flange 36 and is peripherally notched at 40 to receive the lugs 37 and their wear plates 38. The disk 28 is provided with an annular boss 41 on its forward face and this boss is of proper size to move between the parts 31 and 36 so that forward movement of the plate or disk 28 will force the clutch members into close frictional engagement. This clutching engagement holds the gears 30 from rotation since the disks 34, splined to the gears 30, are prevented from rotating. Also the frictional engagement of the disks 34 with the clutch members 33 and 39 and the rear face of the gear 22 and part 35 aid in clutching the drum 24 and gear 22 together. Obviously, if the gears 30 cannot rotate the gears 22 and 27 can have no relative rotative movement. Thus the clutch mechanism acts in two ways, to frictionally clutch the gears 27 and 22 together and to mechanically hold them against relative rotation by stopping rotation of the gears 30.

On the plate or disk 28 is a hub 42 having a shipper groove 43 wherewith engages a shipper arm 44. This shipper arm extends forwardly over the top of the parts just described and terminates at its forward end in a depending arm 45. A pedal lever 46 is pivoted at its lower end to the housing 10 as at 47. A plunger 48 is pivoted to the lever 46 and extends into the housing and through the arm 45, being provided with a head 49 behind said arm. A spring 50 surrounds this plunger between the housing and the arm 45 and urges the arm rearwardly. It will now be plain that forward pressure exerted on the upper end of the lever 46 will force the disk 28 forward and move the parts to clutching position while release of the pedal will move the parts to clutch releasing position.

The disk 28 is provided with a peripheral flange 51 forming a brake drum and this drum is surrounded by the usual brake band 52. The free ends of this band are connected by the linkage 53 to the reversing brake pedal lever 54 so that forward pressure on the brake pedal will set the brake and check rotation of the disk 28.

In the operation of the parts thus far described, it will be observed that the gear 15 is smaller than the gear 21 and that the gear 26 is smaller than the gear 25. This arrangement gives the low gear ratio. With the clutch engaged the gear 22 will rotate with the gear 25 and thus the tail shaft will drive in forward direction and at low speed. In reversing, the clutch is left in released position and the brake 52 applied. This holds the disk 28 against rotation. The clutch being released the gears 30 are free to revolve. These gears 30 thus become idlers and reverse the movement of the gear 22 and shaft 18.

Mounted intermediate the splined portion of the shaft 18, is a sleeve 55 having at its rear end a flange 56. On the exterior of the sleeve and extending from the flange forwardly are spaced arcuately tapered pockets 57. Mounted on the sleeve is a cage consisting of a pair of spaced end plates 58 and 59 which are held in proper spaced relation by tie bars 60. Supported revolubly on shafts 61 carried by the plates 58 and 59 are rollers 62, each located in a respective pocket.

Revolubly mounted on the sleeve 55 is a ring gear 63 which constantly meshes with a gear 64 formed on the sleeve 20. The gears 63 and 64 form the intermediate gearing of the transmission. Mounted on the splined portion of the shaft adjacent its forward end is a second sleeve 65 similar to the sleeve 55 and like it provided with arcuately tapering pockets 66.

A cage having a front plate 67 and rear plate 68 connected by tie bars 69 is mounted on the sleeve and carries rollers 70. This sleeve and its rollers fits inside of an annular flange 71 formed on the rear end of the shaft 13 which carries the gear 15. Located between the two sleeves 55 and 65 is a disk 72 which is splined on the shaft 18. Through this disk 72 extends a pin 73 provided with bearing cups 74 at its ends which slide in the respective plates 68 and 58. Lugs 75 are formed on the plates 68 and 58 (see Figure 12) and springs 76 are positioned between these lugs and the end portions of the pin 73. The disk 72 is provided with a shipper groove 77 wherein fits a finger 78 formed on the end of an arm 79 having three spaced notches, as at 80, to receive a spring pressed ball 81 forming a positioning stop by which the arm, and consequently the disk 72, may be held in any one of three selected positions. This arm is urged rearwardly by a spring 82 and is operated against the action of said spring by a pedal 83.

It is to be noted that the spring 82 normally holds the arm in the central notch or what may be termed high speed position. Also the arm 79 carries a roller 83 which is engaged by the tail or lower end of the part 45 so that operation of the pedal lever 46 moves the arm 79 rearwardly to engage in the forward notch. On the pin 73 is a lug or stop 84.

In the operation of this part of the device, the sleeve 55 rotates with the shaft 18 but the gear 63 rotates with the sleeve 20 and thus, in starting, the sleeve has a higher rotational speed than the shaft so that the rollers 62 lie at the large ends of the tapered pockets. When the lever 83 is pressed it moves the bar or arm 79 and the disk 72 rearwardly which presses the cage plate 58 into contact with the ring of the gear 63 and, by yielding of the springs 76, the cage revolves with the gear 63 and thus the rollers are moved toward the narrow ends of the pockets and clutch the sleeve 55 to the gear 63 which causes the shaft 18 to revolve at second speed. Similarly, if the disk 72 be moved forwardly the sleeve 65 will be clutched to the flange 71 of the shaft 13 and the shafts 13 and 18 will thus revolve in unison. Obviously, the movement of the shaft 18 at high speed will free the second speed clutch. Obviously also, with either the second or high speed clutches engaged, free wheeling will be had since the shaft 18 can rotate faster than either the second speed gear or the shaft 13 as the case may be.

It is desirable, at times, to prevent free wheeling. To this end the sleeve 65 is provided with a pair of radial slots 84 opening into oppositely disposed pockets 66. Plungers 85 are mounted in these slots and are arranged to project into the pockets so as to hold the rollers at the smaller ends thereof. Wedge pieces 86 work underneath these plungers and are carried by the disk 72 so that when it is moved forwardly from its central or normal high speed position these wedge pieces force the plungers outwardly and lock the rollers 70 in clutching positions.

There has thus been provided a simple and efficient device of the kind described and for the purpose specified.

It is obvious that many minor changes may be made in the form and construction of the invention without departing from the principles thereof. It is not, therefore, desired to confine the invention to the exact form herein shown and described but it is desired to include all forms properly coming within the scope claimed.

What I claim is:

1. In a device of the kind described, an external gear wheel, an internal gear wheel concentric to the first wheel and surrounding the same, idler gears interposed between said gear wheels and each meshing with both of the gear wheels, a pair of clutch plates concentric to each other and each splined to a respective gear wheel of the first two gear wheels, other clutch plates each splined to a respective idler gear and movable into and out of simultaneous clutching engagement with the first two clutch plates, and means for releasably engaging the clutch plates and forcing them into clutching relation.

2. In a device of the kind described, an external gear wheel, an internal gear wheel concentric to the first wheel and surrounding the same, idler gears interposed between said gear wheels and each meshing with both of the gear wheels, a pair of clutch plates concentric to each other and each splined to a respective gear wheel of the first two gear wheels, other clutch plates each splined to a respective idler gear and movable into and out of simultaneous clutching engagement with the first two clutch plates, means for releasably engaging the clutch plates and forcing them into clutching relation, the clutch plates on the idler gears being arranged alternately on one side and the other of the first clutch plates.

3. In a device of the kind described, an external gear wheel, an internal gear wheel concentric to the first wheel and surrounding the same, idler gears interposed between said gear wheels and each meshing with both of the gear wheels, a pair of clutch plates concentric to each other and each splined to a respective gear wheel of the first two gear wheels, other clutch plates each splined to a respective idler gear and movable into and out of simultaneous clutching engagement with the first two clutch plates, means for releasably engaging the clutch plates and forcing them into clutching relation, said means including a revoluble brake disk wherefrom said idler gears are rotatably supported, said brake disk having a braking surface, a brake movable into and out of engagement with the braking surface, and means to operate said brake.

HOPE DARRING LESTER.